(12) United States Patent
Kowatari et al.

(10) Patent No.: US 7,054,726 B2
(45) Date of Patent: May 30, 2006

(54) CONTROL APPARATUS FOR VEHICLE-USE ELECTRIC POWER GENERATOR

(75) Inventors: Takehiko Kowatari, Kashiwa (JP); Tatsuyuki Yamamoto, Mito (JP); Norikazu Matsuzaki, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/387,512

(22) Filed: Mar. 14, 2003

(65) Prior Publication Data
US 2003/0176956 A1 Sep. 18, 2003

(30) Foreign Application Priority Data
Mar. 15, 2002 (JP) ............... 2002-071188

(51) Int. Cl.
*B60L 11/00* (2006.01)
(52) U.S. Cl. ............... 701/22; 701/74; 180/65.1; 180/65.3; 290/40 A; 903/942
(58) Field of Classification Search ............... 701/22, 701/70, 74, 101–102; 180/65.1–65.6; 290/40 A, 290/40 C, 7, 9, 14, 17, 27, 32, 47–48; 903/916, 903/942
See application file for complete search history.

(56) References Cited

U.S. PATENT DOCUMENTS

| 5,238,083 | A | * | 8/1993 | Horie et al. | 180/274 |
|---|---|---|---|---|---|
| 5,480,220 | A | * | 1/1996 | Kumar | 303/151 |
| 5,777,442 | A | * | 7/1998 | Miyata | 318/2 |
| 6,480,767 | B1 | * | 11/2002 | Yamaguchi et al. | 701/22 |
| 6,549,832 | B1 | * | 4/2003 | Nakasako et al. | 701/22 |
| 6,602,157 | B1 | * | 8/2003 | Kashiwase | 475/5 |
| 6,603,278 | B1 | * | 8/2003 | Oshima et al. | 318/139 |
| 6,752,225 | B1 | * | 6/2004 | Kojima | 180/65.3 |
| 2002/0139592 | A1 | * | 10/2002 | Fukasaku et al. | 180/65.2 |
| 2003/0089539 | A1 | * | 5/2003 | Kadota | 180/65.2 |
| 2003/0094816 | A1 | * | 5/2003 | Kazama | 290/40 C |
| 2004/0094342 | A1 | * | 5/2004 | Kowatari et al. | 180/65.2 |

FOREIGN PATENT DOCUMENTS

JP 2000-142155 5/2000

\* cited by examiner

*Primary Examiner*—Gertrude A. Jeanglaude
(74) *Attorney, Agent, or Firm*—Antonelli, Terry, Stout and Kraus, LLP.

(57) ABSTRACT

It is desirable prevent the speed of an engine, that is driving an electric-power generator, from abruptly increasing when electric power generation by the electric power generator, which supplies electric power to a wheel-driving motor, is stopped. Thus, a control apparatus is provided for a vehicle electric power generator to control the amount of electric power generated by the electric power generator, which is connected to, and driven by, an engine for driving a vehicle. Wheel speed detection means is provided to detect slipping of the wheels, and the control apparatus operates to ensure that, when the amount of electric power generated is to be reduced, if the wheels are not slipping, the amount of electric power generation by the electric power generator is slowly reduced, in comparison with the case where the wheels are slipping.

7 Claims, 6 Drawing Sheets

CONTROL APPARATUS FOR VEHICLE-USE ELECTRIC POWER GENERATOR

BACKGROUND OF THE INVENTION

The present invention relates to a control apparatus for a vehicle electric power generator that can control the amount of electric power supplied to a vehicle-driving assist motor.

There is a known method of reducing the output of an engine by using an electronically controlled throttle or the like, in which, when the load on the engine decreases, an increase in engine speed and a slipping of the wheels will be avoided or minimized.

A control method for preventing engine stall, which tends to occur when the electric power output of the electric power generator used in a vehicle is abruptly increased in an attempt to augment the driving force of its motor abruptly, is also disclosed in Japanese Application Patent Laid-open Publication No. 2000-142155.

In a vehicle having an electric power generator connected to the engine for driving the vehicle, reduction in the amount of electric power to be generated is likely to reduce the electric power generating torque of the generator, thereby causing the torque of the engine to become correspondingly excessive, and resulting in the engine speed being increased, the vehicle being abruptly accelerated, and a feeling of uneasiness being given to the driver.

These events are particularly prone to occur in a vehicle that is so constructed that either the front or rear wheels are driven by the engine and the other wheels not driven by the engine are driven by a motor to which electric power is supplied from an electric power generator driven by the engine. For vehicles of this type, since the electric power generating torque of the power generator is large, excessive engine torque generated when the torque generated by the motor decreases will also become significant.

Figure 9:
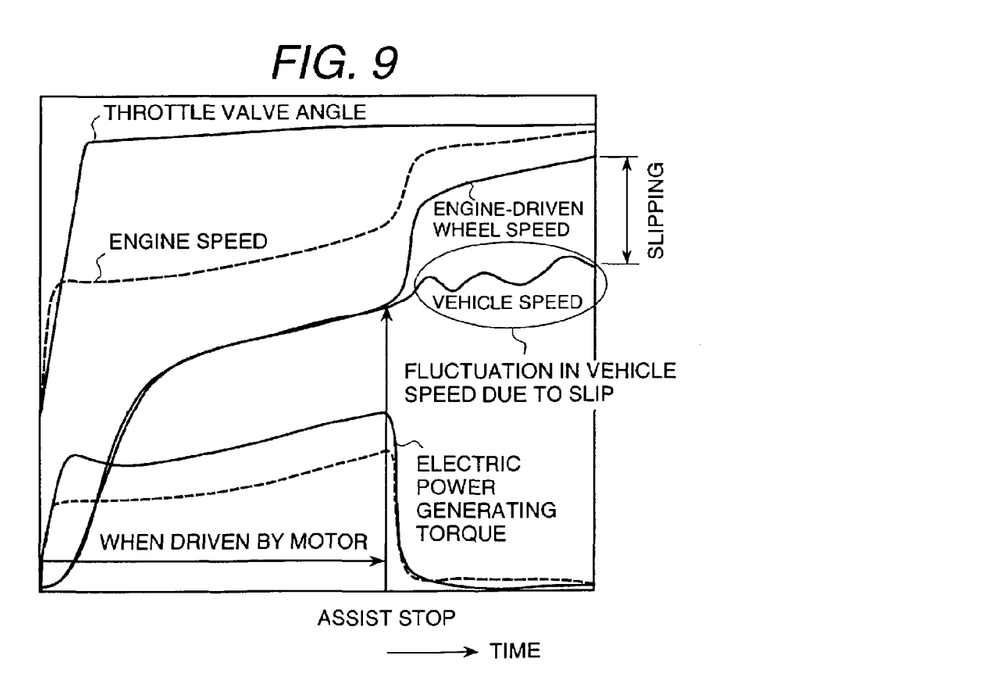
FIG. 9 is a diagram illustrating the results of control that have been obtained when no slipping was detected.

Accordingly, when the torque of the motor is abruptly reduced, the torque of the wheels driven by the engine will also increase significantly, and such abrupt increases in engine speed and abrupt acceleration of the vehicle, that the driver does not intend, may occur. In extreme cases, as shown in FIG. 9, the wheels driven by the engine slip, and the acceleration of the vehicle becomes unstable.

The present inventors have newly discovered the above-described problems in the control of a vehicle that is constructed so that either one of the rear wheels is driven by the engine and the other wheels not driven by the engine are driven by a motor to which electric power is supplied from an electric power generator driven by the engine.

With regard to the foregoing problems, however, although it is easily conceivable to reduce the torque of the engine by using an electronically controlled throttle, this method has the disadvantage that the acceleration characteristics easily deteriorate. Also, an electronically controlled throttle is required for the control of the engine, and the control itself becomes complex.

SUMMARY OF THE INVENTION

An object of the present invention is to provide not only a vehicle which, by adopting a simplified system configuration, can attain smooth acceleration, even after driving by the motor has been stopped and the vehicle driving source has been switched to engine driving only, and which can run at a stable engine speed, but also a control apparatus for controlling the electric power generator which supplies power to the motor.

In order to achieve the above-stated object, the control apparatus for a vehicle electric power generator, based on the present invention, is equipped with a slip detection means for detecting the slipping of wheels of the vehicle and is designed so that, when slipping is not detected by the slip detection means, the electric power generator control apparatus operates to control the amount of electric power generated by the power generator, that is connected to and driven by the engine driving the vehicle, so as to slowly reduce the amount of electric power generated by the power generator, in comparison with the case in which slipping is detected.

BRIEF DESCRIPTION OF THE DRAWINGS

FIGS. 7(*a*) and 7(*b*) are diagrams showing changes in the electric power generation amount and torque obtained by applying the present invention;

DESCRIPTION OF THE INVENTION

Figure 1:
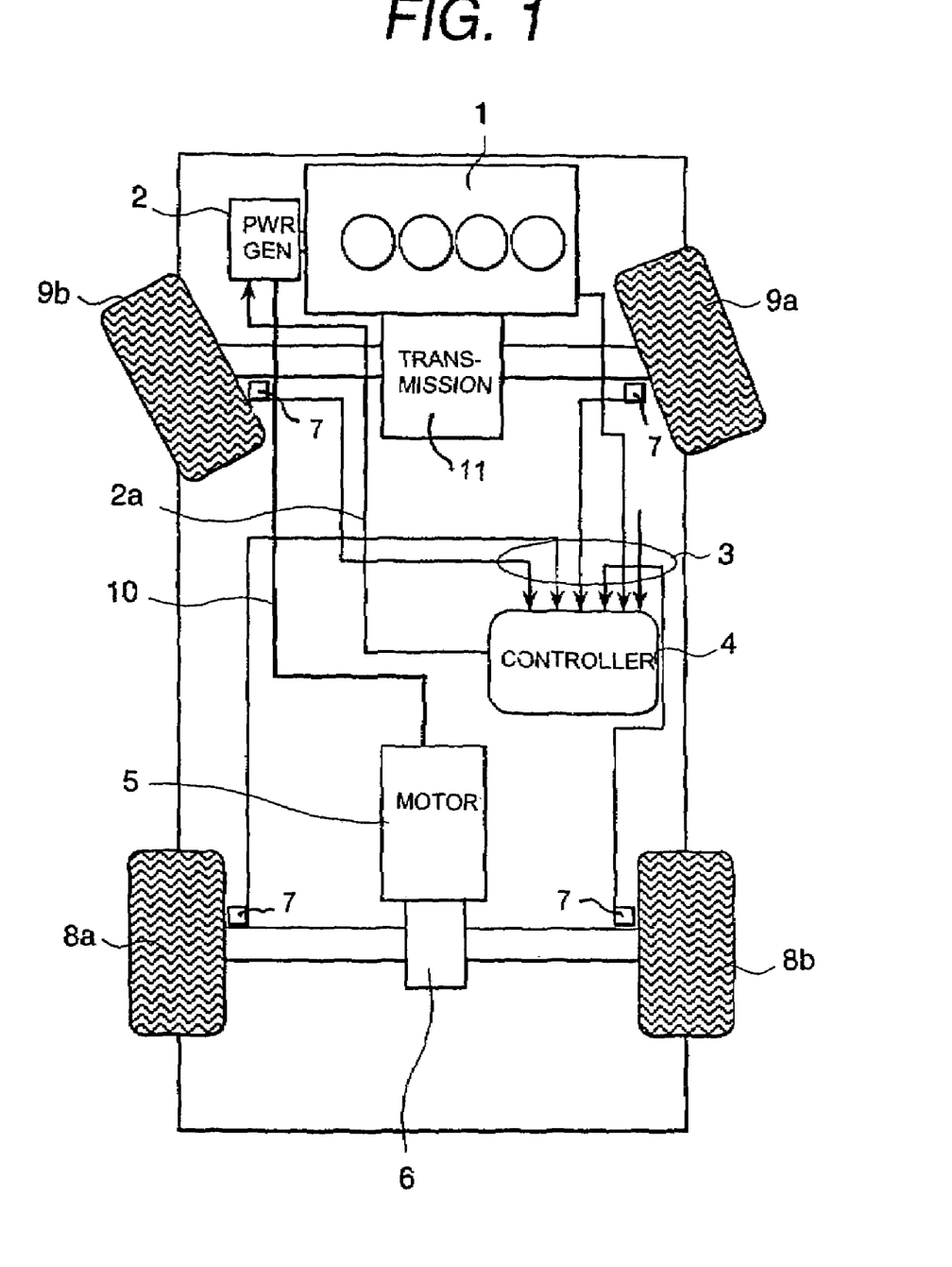
FIG. 1 is a diagram which shows a vehicle to which the present invention has been applied.

An embodiment of the present invention will be described with reference to the drawings. A vehicle with a mounted electric power generator control apparatus for controlling the amount of electric power generated by the power generator is shown in FIG. 1.

This vehicle comprises an engine 1 that generates a driving force, drive wheels 9*a* and 9*b* that are driven through a transmission 11 using the driving force of the engine 1, an electric power generator 2 that is driven by the engine for generating electric power, and a controller 4 for controlling the amount of electric power generated by the electric power generator 2.

The vehicle further comprises a motor 5 for generating a motor assist force, wheels 8*a* and 8*b* that are driven by the motor 5, and a differential 6 for distributing the driving force of the motor 5 to the two wheels 8*a* and 8*b*, the differential 6 containing a clutch by which the driving force of the motor is activated and deactivated.

The vehicle also comprises wheel speed sensors 7 for detecting the rotational speed of each wheel, wiring 10 through which the electric current generated by the power generator 2 is to be supplied to the motor 5, a signal line 2*a* through which the amount of electric power generation by the power generator 2 is controlled from the controller 4, and an accelerator pedal sensor (not shown) for detecting the extent of the depression of an accelerator pedal (that is to say, for detecting the opening angle of the throttle value). Signals from the accelerator pedal sensor and the wheel speed sensors 7 are transmitted to the controller 4. The front wheels 9a and 9b of this vehicle are driven by the engine 1, and the rear wheels 8a and 8b are driven by the motor 5.

Usually, this vehicle runs while driving the wheels 9a and 9b using the engine 1. As the case may be, however, at low speeds (up to about 30 km/h), the wheels 8a and 8b, which are not driven by the engine 1, are driven by the motor 5. At speeds exceeding about 30 km/h, the clutch built into the differential 6 is disconnected, because of the deterioration in the efficiency of the motor 5 due to a significant loss of energy, so that the supply of electric power to the motor is stopped, in order to prevent excessive rotation of the motor due to the simultaneous rotation thereof with, and incited by, the drive wheels 8a and 8b, and in order to prevent the loss of energy due to the frictional resistance of the differential 6 and the motor 5.

When the vehicle starts from a stationary condition and runs at a speed exceeding its low-speed range, although, as described above, the motor is to be stopped and the clutch inside the differential is disconnected, power generation by the power generator, to which the motor is connected, must be stopped in order to stop the motor, therefore the controller 4 stops the power generation. If the power generation is suddenly stopped by the controller 4, the engine torque that has been consumed by the power generator will suddenly become excessive and the torque will be abruptly transmitted to the wheels driven by the engine 1 and may lead to shocks, wheel slipping, and/or abrupt increases in engine speed. In order to prevent these events from occurring, the controller 4 conducts the following control.

Figure 2:
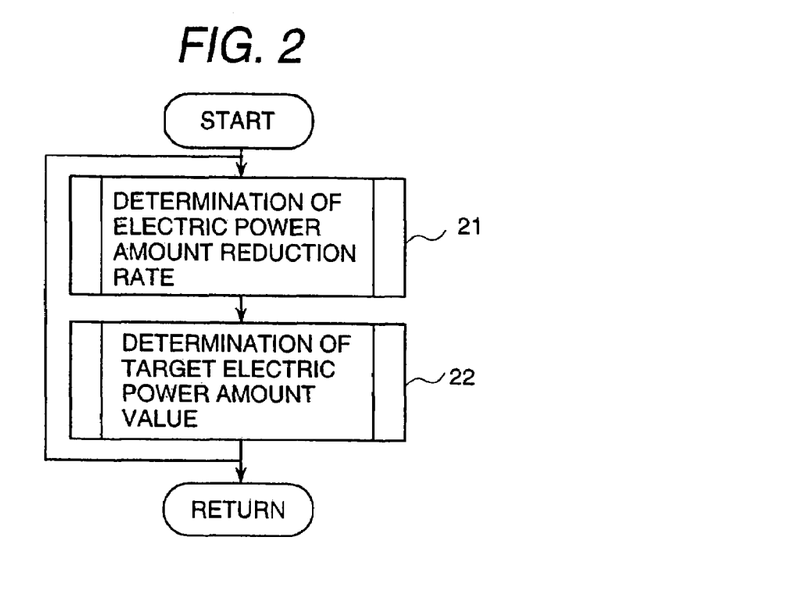
FIG. 2 is a control flow diagram of the basic control blocks constructed to reduce the amount of electric power generation by the electric power generator.

An outline of the control conducted to reduce the torque of the motor is shown in FIG. 2. In order to reduce the torque of the motor, the rate at which the amount of electric power being generated by the power generator is to be reduced is examined in block 21.

In block 22, the amount of electric power to be generated is determined on the basis of the arithmetic results obtained in block 21. Then, the electric power generation amount of the power generator is actually controlled to match the electric power generation amount that was determined in block 22. Because of this configuration, the rate of reduction can be set to various values when the amount of electric power being generated is to be reduced.

Figure 3:
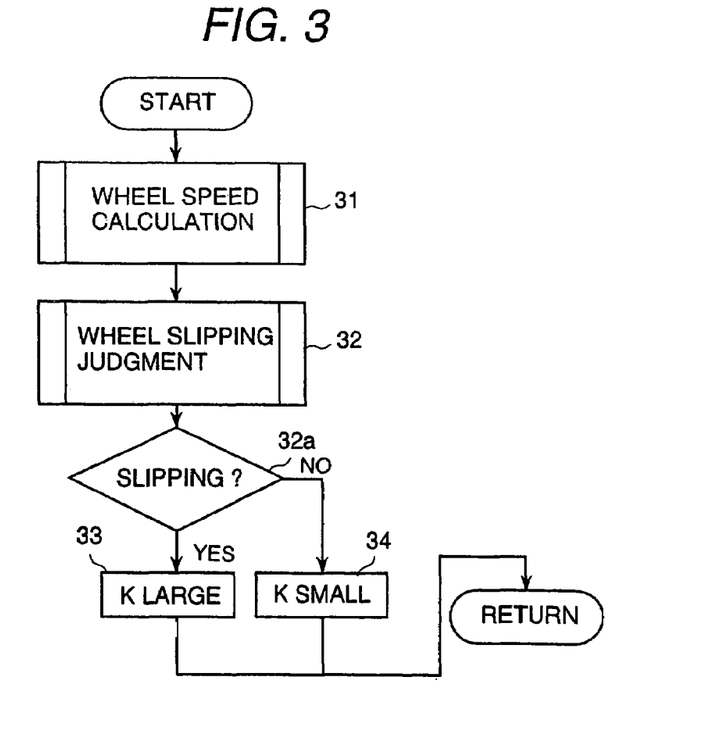
FIG. 3 is a control flow diagram of the control blocks used for determining the reduction rate of the amount of electric power generation by the electric power generator.

The contents of the block 21 are shown in FIG. 3. Signals from the wheel speed sensors 7, functioning as a wheel speed detection means to measure the rotational speed of each wheel, are received in block 31. In order to detect the occurrence of slipping, the difference in speed between the front and rear wheels, in particular, is examined in block 32 on the basis of the detection signals of the wheel speed sensors 7. If the speed of the rear wheels is higher, the rear wheels are judged to be slipping, and the control sequence advances to block 33. If the rear wheels are not slipping, the control sequence advances to block 34.

In blocks 33 and 34, the reduction rate of the electric power generation amount is specified as a coefficient (K). There is a positive correlation between the coefficient (K) and the reduction rate, and when the coefficient (K) is increased, the reduction rate will also be reduced. In block 33, the value of the coefficient K is always greater than in block 34. That is to say, when slipping is detected, the amount of electric power to be generated will always be reduced at a higher rate than in the case where no slipping is detected. The reason for this will be described below.

The vehicle in the present embodiment uses the engine 1 as the driving source for the front wheels and the motor 5 as the driving source for the rear wheels. In general, since the slipping of the rear wheels makes the vehicle prone to spin, it is preferable that any slipping of the rear wheels should be avoided as much as possible.

For this vehicle, in the event that the rear wheels slip, to stop the slipping rapidly, it is effective to immediately reduce the torque of the motor, namely, the amount of electric power to be generated. In case of such slipping, therefore, the coefficient (K) is set so that the reduction rate is increased.

Conversely, if no such slipping is occurring, abrupt reduction in the amount of electric power being generated must be avoided. Otherwise, the torque to the wheels driven by the engine will abruptly increase, resulting in the possible slipping of the front wheels as well. If the rear wheels are not slipping, therefore, the coefficient (K) stored in block 34 will be adopted. The value of this coefficient (K) is smaller than the coefficient (K) stored in block 33.

In block 22, a new control target relating to the amount of electric power to be generated is determined according to the electric power generation amount reduction rate that was determined in block 21. The amount of electric power being generated is not always linearly proportional to the electric power generating torque, and abrupt changes in the torque are likely to appear when the amount of electric power being generated is reduced. In order to prevent such changes, therefore, the amount of electric power being generated by the power generator is replaced with the torque thereof first.

Next, the torque is reduced at the prescribed reduction rate. Finally, the torque is replaced with the amount of electric power, and then the power generator is controlled according to this electric power amount. It is possible, by providing such control, to reduce the torque smoothly, to prevent the engine torque from changing abruptly, and thus to obtain smoother acceleration of the vehicle.

As described above, depending on whether the rear wheels are slipping, since the reduction rate of the amount of electric power being generated by the power generator is set, this control method is effective in that, if the motor-driven wheels slip, the driving torque of the motor can be rapidly reduced, and if no such slipping occurs, the torque of the wheels driven by the engine can be increased smoothly.

Figure 4:
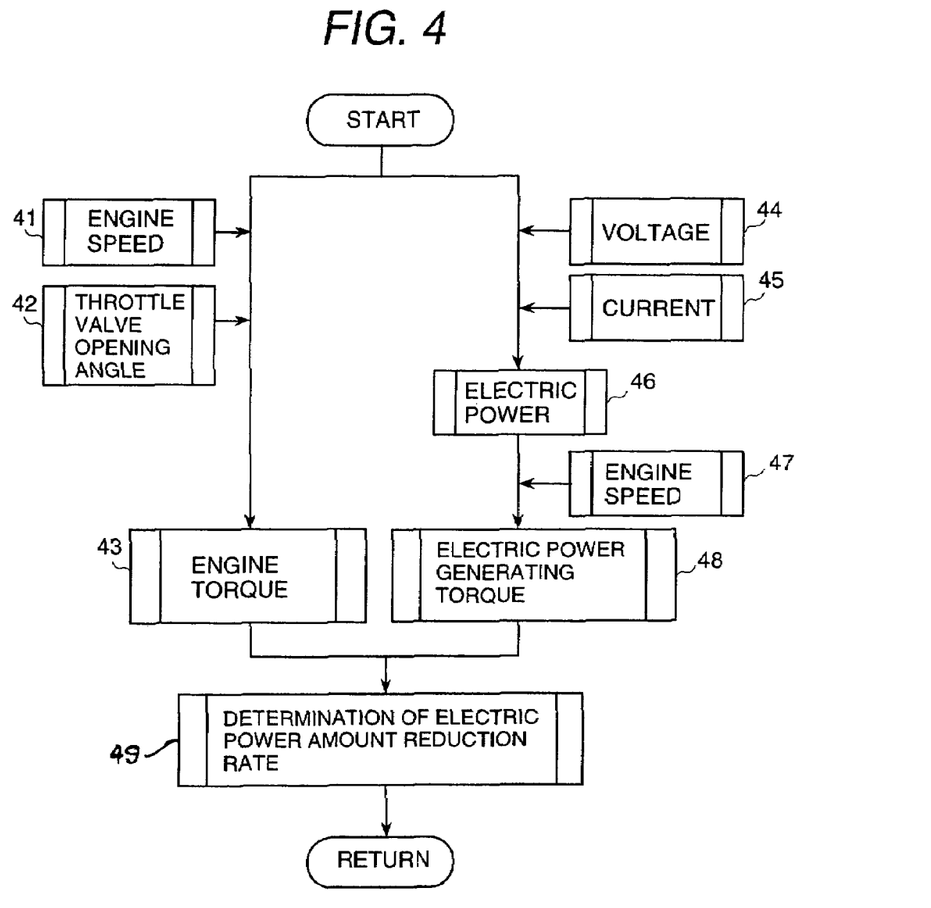
FIG. 4 is a control flow diagram of the control blocks for determining the reduction rate of the amount of electric power when no wheels are slipping.

A method of stopping the power generator more smoothly even when no slipping is occurring will be described with reference to FIG. 4. In this case, block 34 is replaced with blocks 41 to 49. When the absence of slipping is judged in block 32, the engine speed will be computed from the engine speed sensor pulse width in block 41; and, then, in block 42, the opening angle of the throttle valve will be calculated using the signal sent from the throttle valve opening angle sensor.

The results obtained in blocks 41 and 42 will be checked against an engine torque two-dimensional table having a prestored set of throttle valve opening angles and engine speeds, as its parameters; and, in this way, the engine torque will be calculated in block 43. The results will be transmitted to block 49.

In block 44, the present output voltage of the power generator is detected; in block 45, the present output current of the power generator is detected, and in block 46, the amount of electric power being generated is calculated. In block 47, the engine speed that was calculated in block 41 is received; and, in block 48, the present electric power generating torque is calculated from the power generator's power generating torque table containing the amount of electric power generated by the power generator, and from the speed of the engine, as its parameters.

After this, in block 49, the torque of the engine is divided by the electric power generating torque of the power generator to calculate the ratio of the engine torque with respect to the torque of the power generator, and then this ratio is multiplied by an experimentally calculated constant that varies from vehicle to vehicle. The coefficient (K) representing the reduction rate of the amount of electric power being generated is obtained as a result.

When the electric power generating torque is greater than the engine torque, that is to say, when the excessive engine torque generated by the stoppage of electric power generation is great, the reduction rate of the amount of electric power being generated is reduced, subject to the coefficient (K) that has been calculated, as described above, as an electric power amount reduction rate from the ratio of the engine torque with respect to the electric power generating torque.

By executing blocks 41 to 49, the reduction rate of the amount of electric power being generated can be reduced when the amount of electric power is too large, and the abrupt occurrence of excessive engine torque that occurs when the amount of electric power being generated is reduced can be suppressed.

Although, during this sequence, the reduction rate of the amount of electric power being generated is determined from the current engine torque and the current electric power generating torque of the power generator, the reduction rate of the amount of electric power being generated can likewise be determined, as follows, to reduce the amount of electric power at a rate desirable for the vehicle driver.

Under a configuration, as in the configuration of this vehicle, in which a motor is connected directly to the power generator driven by the engine, energy conversion loss occurs, since the power generator converts mechanical energy into electrical energy and since the motor reconverts the electrical energy into mechanical energy.

When the driver desires faster acceleration, higher energy efficiency can be obtained by stopping the driving force of the motor as soon as possible and accelerating the vehicle using only the driving force of the engine. When wishing to accelerate the vehicle rapidly, the driver usually increases the extent of actuation of the accelerator pedal (increases the opening angle of the throttle valve) or increases the rate of actuation of the accelerator pedal. It is therefore possible to obtain abrupt acceleration in line with the intent of the driver by storing the accelerator pedal operation patterns of the driver in memory beforehand, and then stopping the driving of the motor rapidly by increasing the reduction rate of the electric power generation amount of the power generator according to the abrupt acceleration level desired.

Figure 5:
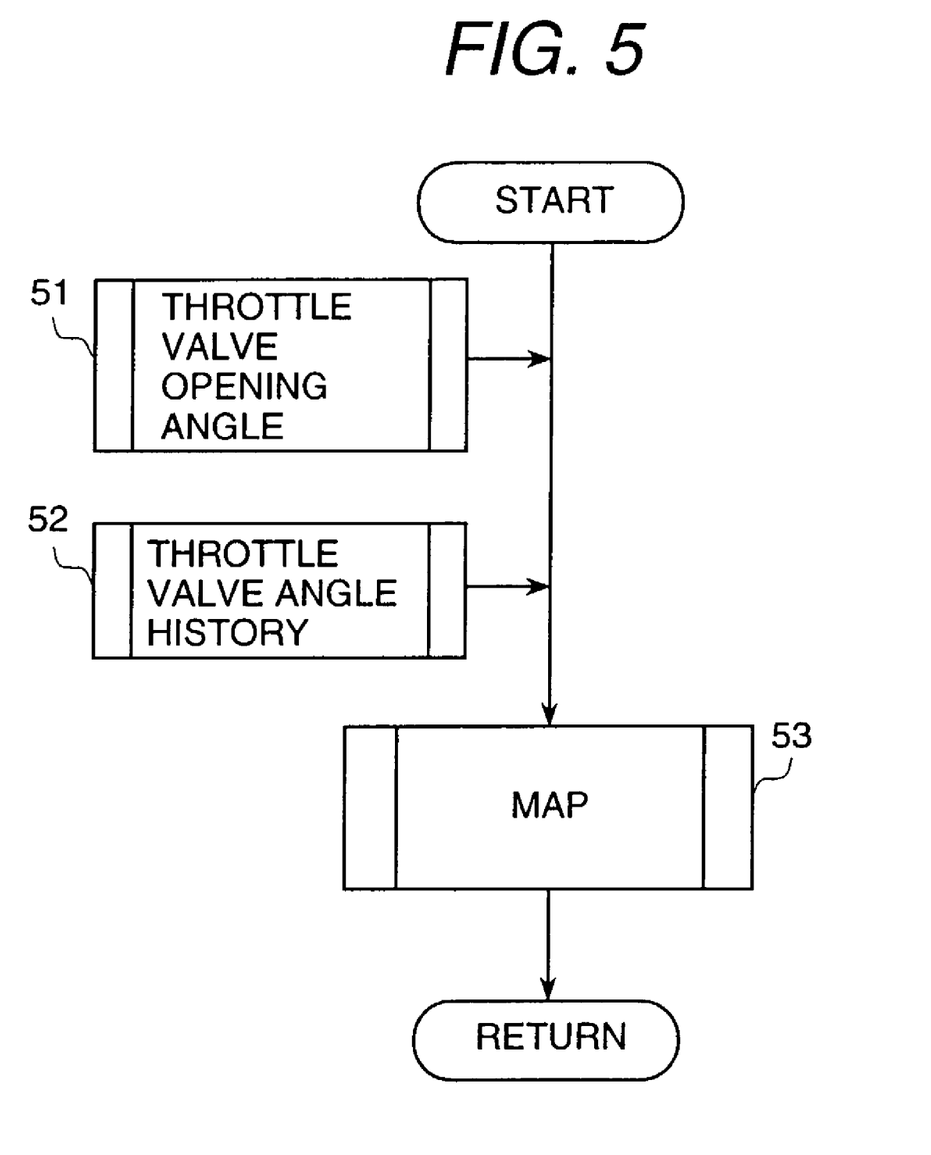
FIG. 5 is a control flow diagram of the control blocks for determining the reduction rate of the amount of electric power when an example of the accelerator pedaling patterns of the driver is considered.

The simplified method shown as blocks 51 to 53 in FIG. 5 is available to identify a pattern of accelerator pedal actuation.

In block 51, the throttle valve opening angle is detected, as in block 42. In block 52, the chronological history of the values detected in block 51 is recorded, and the chronological rate of change of the throttle valve opening angle is calculated from the chronological history.

In block 53, there is a table of coefficients (K) respectively corresponding to the current throttle valve opening angle values that were calculated in block 51 and the chronological rate of change values of the throttle valve opening angle which were calculated in block 52, with each coefficient (K) representing the reduction rate of the amount of electric power generation at a particular time. This table is constructed so that, as the chronological rate of change or the opening angle of the throttle valve increases, the coefficient (K) will increase.

Therefore, the coefficient (K) increases when the amount of accelerator pedal actuation is large or when the rate of actuation thereof is high. As a result, the reduction rate of the electric power generation amount of the power generator increases, whereby the driving of the motor is stopped more rapidly, and acceleration of the vehicle by the driving force of the engine alone can be obtained.

Figure 6:
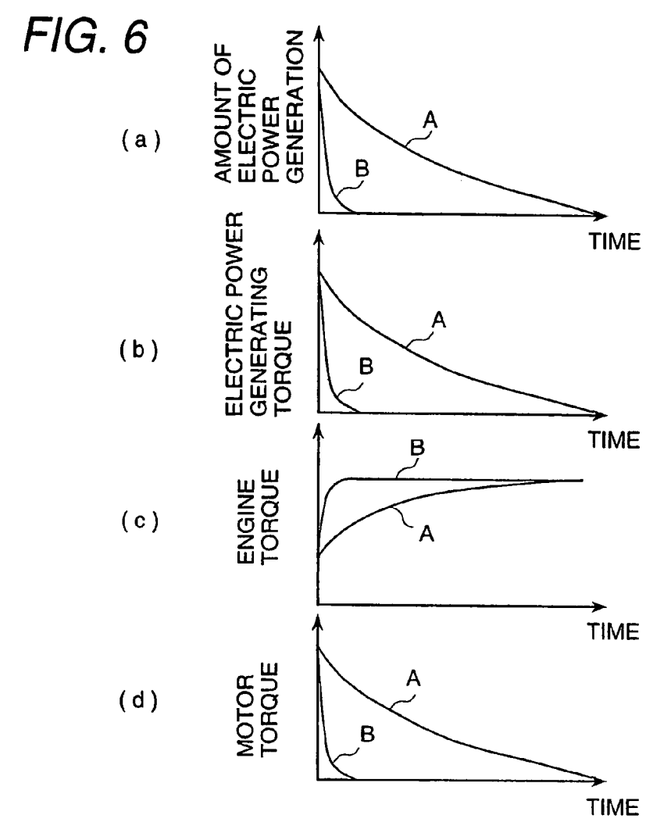
FIG. 6 shows a series of graphs representing the results of the control of the target electric power generation amount of the electric power generator.

Examples of the results that have been obtained using the control of this embodiment are shown in FIG. 6 by graphs (a) to (d). Chronological changes in the amount of electric power in the cases where the coefficient K is small and where this coefficient is large are shown as curves A and B, respectively, in graph (a) of FIG. 6.

Likewise, chronological changes in electric power generating torque, changes in engine-driven wheel torque, and changes in motor torque are shown by graphs (b), (c), and (d), respectively, of FIG. 6. In the case where the coefficient K is large (curve B), the amount of electric power, the electric power generating torque, and the motor torque abruptly decrease, compared with the case where the coefficient K is small. Conversely, the engine-driven wheel torque abruptly increases.

Figure 7:
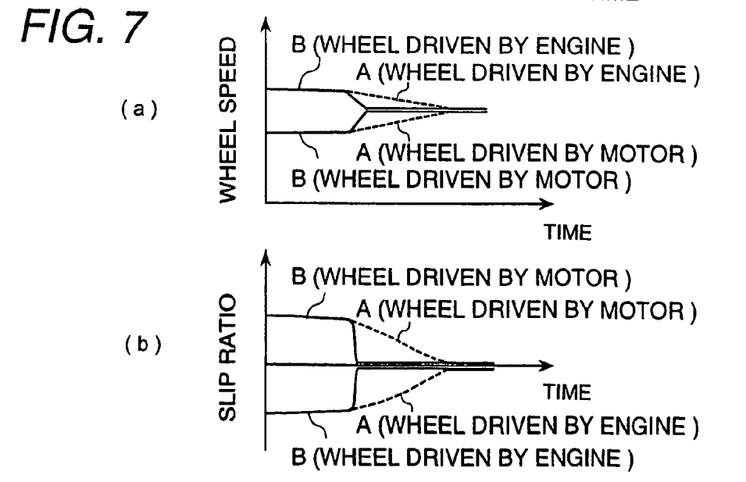

Chronological changes in wheel speed and in slip ratio, in the case where the wheels are slipping, are shown in FIG. 7 by graphs (a) and (b). Curve B (solid line) shows the plots that have been obtained when this embodiment was employed, and the coefficient K in this case is large. For comparison, the plots in the case where the coefficient K is small are shown as curve A (dotted line). It can be seen from FIG. 7 that, by increasing the coefficient K when the wheels are slipping, the wheel speed of the engine-driven wheels and that of the motor-driven wheels can be rapidly matched, that is to say, the slip ratio can be brought closer to zero, which indicates that stable running of the vehicle can be obtained more rapidly.

Figure 8:
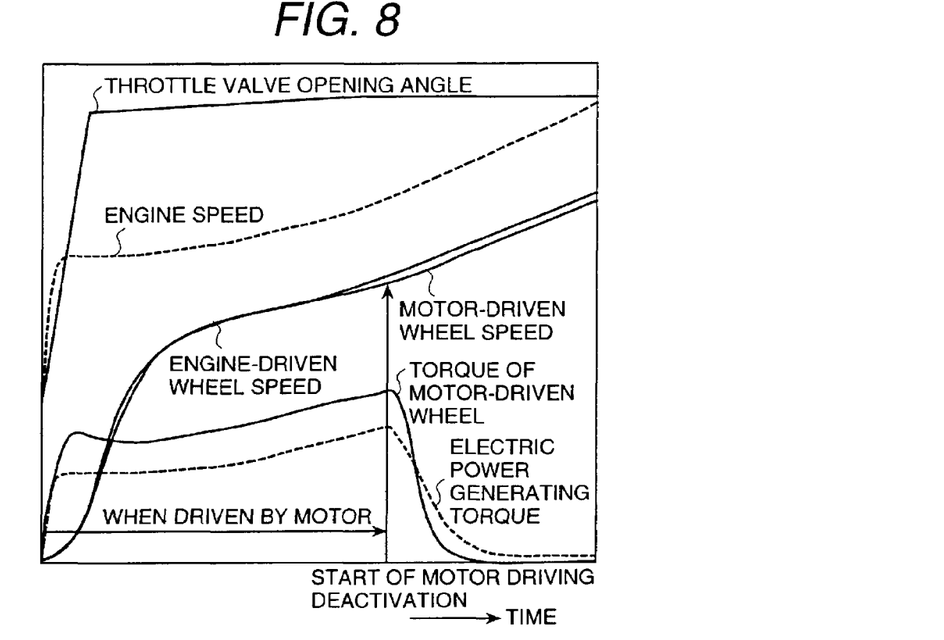
FIG. 8 is a diagram illustrating the results of control that have been obtained when slipping was detected.

An example of application of this embodiment to the case where no wheels are slipping is shown in FIG. 8. Since no wheels are slipping, coefficient K decreases and the reduction in electric power generating torque becomes slower. Hereby, the torque of the motor-driven wheels is reduced more slowly and no wheel slipping occurs.

According to the present invention, it is possible, by constructing a simplified system, to obtain smooth vehicle acceleration, even after motor driving has been stopped and the driving mode has been switched to engine driving alone; and, thereby, it is possible to drive the vehicle under a stable status of engine speed.

What is claimed is:

1. A control apparatus for a vehicle electric power generator, to control an amount of electric power generated by the electric power generator, which is connected to, and driven by, an engine for driving the vehicle, wherein said control apparatus is equipped with:

an engine speed detection means for detecting revolving speed of the engine of said engine, a throttle valve opening angle detection means for detecting an opening angle of the throttle valve of the vehicle, an electric power amount detection means for detecting a current amount of electric power generation and an electric power generating torque detection means for detecting a current electric power generating torque; and a controller that changes a reduction rate of the electric power generation amount according to the values detected by said engine speed detection means, said throttle valve opening angle detection means, and said electric power amount detection means, wherein, when the amount of electric power generated is to be reduced, in the case where, irrespective of the electric power generating torque detected by said electric power generating torque detection means, the throttle valve opening angle and engine speed that have been detected by said throttle valve opening angle detection means and said engine speed detection means, respectively, are maintained at the same values, the amount of electric power generated will be reduced more slowly as the electric power generating torque detected by the electric power generating torque detection means increases.

2. A control apparatus for a vehicle electric power generator, in a vehicle comprising a first set of driving wheels driven by an engine, an electric power generator driven by said engine to generate an electric power, and a second set of driving wheels driven by a motor which receives the electric power generated in said electric power generator, wherein control apparatus is provided on the vehicle to control an amount of an electric power generation of said electric power generator and to control reduction of said amount of said electric power generation of said electric power generator in accordance with a stop of the motor during a running time of the vehicle, wherein said control apparatus detects a condition of a wheel speed of said second driving wheel and a condition of a wheel speed of said first driving wheel; and wherein, in order to perform a control of said reduction of said amount of said electric power generation of said electric power generator, in comparison with a first case where said wheel speed of said second driving wheel is detected to have a larger wheel speed than said wheel speed of said first driving wheel, in a second case where said above first case is not detected, said control apparatus varies a reduction rate to make the reduction rate of said amount of said electric power generation of said electric power generator smaller than the reduction rate in said first case.

3. A control apparatus for a vehicle electric power generator, in a vehicle comprising a first set of driving wheels driven by an engine, an electric power generator driven by said engine to generate an electric power, and a second set of driving wheels driven by a motor which receives the electric power generated in said electric power generator, wherein said control apparatus is provided on the vehicle to control an amount of an electric power generation of said electric power generator and to control reduction of said amount of said electric power generation of said electric power generator in accordance with a stop of the motor during a running time of the vehicle;

wherein said control apparatus determines an engine torque from an engine rotational number and a throttle opening degree and determines an electric power generation torque of said electric power generator from an amount of an electric power generation of said electric power generator and an engine rotational number, and wherein, in order to perform a control of said reduction of said amount of said electric power generation of said electric power generation, said control apparatus varies a reduction rate of said amount of said electric power generation of said electric power generator in accordance with said engine torque and said electric power generation torque.

4. In the control apparatus for a vehicle use electric power generator according to claim 3, wherein, in order to perform said control of said reduction of said amount of said electric power generation of said electric power generation, a reduction rate is varied to make small a reduction rate of said amount of said electric power generation of said electric power generator, in a case where a rate of said engine torque as compared with said electric power generation torque is small, in comparison with a case where said rate of said engine torque as compared with said electric power generation torque is large.

5. In the control apparatus for a vehicle use electric power generator according to claim 3, wherein, in order to perform said control of said reduction of said amount of said electric power generation of said electric power generator, in a case where said throttle opening degree and said engine rotational number are substantially equal, respectively, said reduction rate of said amount of said electric power generation of said electric power generator is made small, when said power generation torque is large.

6. A control apparatus for a vehicle electric power generator, in vehicle comprising a first set of driving wheels driven by an engine, an electric power generator driven by said engine to generate an electric power, and a second set of driving wheels driven by a motor which receives the electric power generated in said electric power generator, wherein said control apparatus is provided on the vehicle to control an amount of an electric power generation of said electric power generator and to reduce said amount of electric power generation of said electric power generator in accordance with a stop of said motor during a running time of the vehicle, and wherein, when said control apparatus receives an abrupt acceleration requirement, said control apparatus reduces said amount of said electric power generation by varying a reduction rate to make said reduction rate large in comparison with an ordinary acceleration time.

7. In a control apparatus for a vehicle electric power generator according to claim 6, wherein said abrupt acceleration requirement is discriminated according to operation of the vehicle by a driver.

* * * * *